United States Patent [19]

Chiang et al.

[11] Patent Number: 5,010,134
[45] Date of Patent: Apr. 23, 1991

[54] ACRYLATE/MALEIC ANHYDRIDE COPOLYMER GRAFTED POLYVINYL ALCOHOL GRAFT TERPOLYMERS

[75] Inventors: Wen-Yen Chiang, Taipei; Chun-Min Hu, Keelung, both of Taiwan

[73] Assignee: National Science Council, Taipei, Taiwan

[21] Appl. No.: 559,094

[22] Filed: Jul. 30, 1990

Related U.S. Application Data

[63] Continuation of Ser. No. 259,716, Oct. 19, 1988, abandoned.

[51] Int. Cl.$^5$ .............................................. C08G 81/02
[52] U.S. Cl. .................................... 525/57; 525/194
[58] Field of Search ........................... 525/57, 194, 205

[56] References Cited

U.S. PATENT DOCUMENTS

| | | | |
|---|---|---|---|
| 4,511,682 | 4/1985 | Mayer | 523/402 |
| 4,600,746 | 7/1986 | Schmukler | 525/57 |

FOREIGN PATENT DOCUMENTS

| | | |
|---|---|---|
| 20751 | 5/1974 | Japan . |
| 065388 | 6/1978 | Japan . |

*Primary Examiner*—John C. Bleutge
*Assistant Examiner*—David Buttner
*Attorney, Agent, or Firm*—Bacon & Thomas

[57] ABSTRACT

A polyvinyl alcohol graft terpolymer comprises 70-30% by weight of polyvinyl alcohol and 30-70% by weight of acrylate/maleic anhydride copolymer having 95-30 mole % of acrylate and 50-70 mole % of maleic anhydride, which is prepared by a condensation-coupling reaction through esterification being performed between the hydroxy groups of the polyvinyl alcohol and the anhydride groups of the acrylate/maleic anhydride copolymer. The polyvinyl alcohol graft terpolymer may be further subjected to a heat treatment to have better water resistance and mechanical properties due to the interchain ester linkage between the hydroxyl groups and the anhydride groups therein. Alternatively, the polyvinyl alcohol graft terpolymer may be reacted with an amine to produce a maleamic acid intermediate, and then dehydated to form a maleimide derivative.

12 Claims, 3 Drawing Sheets

ACRYLATE/MALEIC ANHYDRIDE COPOLYMER GRAFTED POLYVINYL ALCOHOL GRAFT TERPOLYMERS

This application is a continuation of application Ser. No. 07/259,716, filed Oct. 19, 1988, which is now abandoned.

BACKGROUND OF THE INVENTION

The present invention relates to polyvinyl alcohol(-PVA) graft terpolymers and, more particalary, the invention relates to acrylate/maleic anhydride copolymer grafted polyvinyl alcohol graft terpolymers.

Polyvinyl alcohol has been recognized as a hydrophilic polymer with excellent physical and mechanical properties. It has been used in such areas as adhesives, emulsions, textitles and in solvent barrier coatings. However, being a water soluble polymer, polyvinyl alcohol has poor water resistance. Also, unplasticized vinyl alcohol polymers show little or no thermo-plasticity before the occurence of decomposition. For overcoming these drawbacks pertaining to PVA, modification of PVA through the use of comonomers, graftings or post reaction is known in the art.

In our previous papers entitled, "Studies of Reactions with Polymers. I. The Reaction of Maleic Anhydride with PVA and th Properties of the Resultant" and "Studies of Reactions with Polymers. II. The Reaction of Maleic Anhydride with Acrylonitrile onto PVA and the Properties of the Resultant" J. Appl. Polym. Sci. 30, 3895 and 4045 (1985), we reported the synthesis of PVA graft copolymers to improve the water resistance of PVA by grafting maleic anhydride (MA) and acrylonitrile using potassium persulfate as an initiator. It has been found that the MA in the side chain would rearrange to form a keto-olefinic structure.

Graft copolymers have been generally synthesized either by polymerization a monomer from an initiating site on a backbone or by linking two different polymers through a polymer reaction. However, it is impossible to synthesize the grafted side chains with an anhydride structure by grafting MA onto PVA by using former grafting methed.

SUMMARY OF THE INVENTION

The present invention provides a class of substantially homogenous random polyvinyl alcohol graft terpolymers containing anhydride side chains comprising 70-30% by weight of polyvinyl alcohol and 30-70% by weight of homogenous random acrylate/maleic anhydride copolymer having the following general formula I:

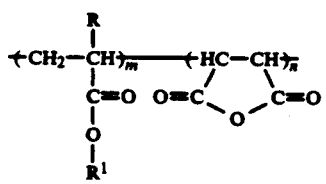

wherein R is hydrogen or methyl; preferably methyl;
R' is $C_1$–$C_4$ saturated alkyl group:
m is 30–90 mole%; and
n is 70–10 mole%.

A process for preparing the polyvinyl alcohol graft terpolymer comprises copolymerizing an acrylate monomer with a maleic anhydride monomer to yield a homogenous random acrylate/ maleic anhydride copolymer, and graft polymerizing the acrylate/ maleic anhydride copolymer onto an vinyl alcohol polymer by a chain-opening esterification reaction being performed between the hydroxyl groups of the polyvinyl alcohol and the anhydride groups of the maleic anhydride.

The polyvinyl alcohol graft terpolymers may be further subjected to a heat treatment to form a crosslinking network as a result of the interchain ester linkage involving the residual hydroxyl groups of the polyvinyl alcohol and the residual anhydride groups of the maleic anhydride therein.

The polyvinyl alcohol graft terpolymers may be used to produce imide derivatives by reacting the residual andydride group on the polyvinyl alcohol graft terpolymer with an amine and subsequently dehydrating the resultant maleamic acid intermediate.

Since PVA is a crystalline polymer and the grafted acrylate/MA is an amorphous copolymer, the PVA-g-acrylate/MA terpolymers of the present invention retain the strength of the PVA while adding flexibility and reduced water sensitivity. Additionally, it is believed that the residual anhydride groups on the side chains and the hydroxyl groups on the backbone form interchain ester linkage during a heating treatment thus yielding better thermal resistance and mechanical properties.

DETAILED DESCRIPTION OF THE INVENTION

Figure 1:
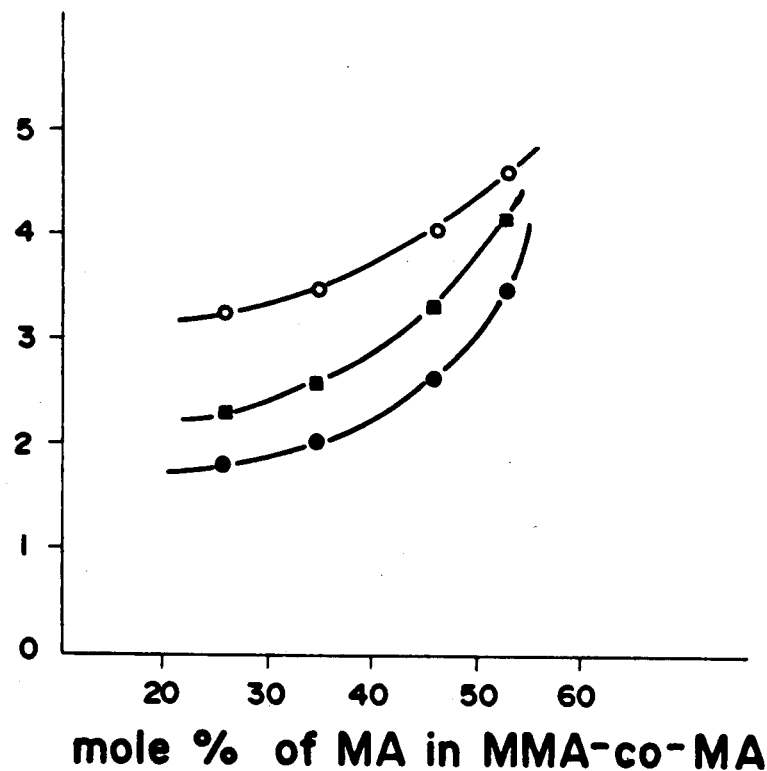
FIG. 1 is a graphic plot showing effect of the mole% of MA in MMA-co-MA on the intrinsic viscosity of PVA-g-MMA/MA for different wt% of PVA in feed.

The present invention provides a modified polyvinyl alcohol composition comprising a graft terpolymer of polyvinyl alcohol and an acrylate/maleic anhydride copolyme of general formula I:

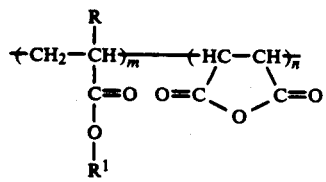

wherein R is hydrogen or methyl; preferably methyl;
R' is $C_1$-$C_4$ saturated alkyl group;
m is 30-90 mole%; and
n is 70-10 mole%.

The preferred R group is metal. Also, it is preferred to use the methacrylate esters, i.e. R is $CH_3$, because of their superior stability under reaction conditions.

In the preferred embodiment, m ranges from 50-90 molle%, and n ranges from 10-50 mole%.

Th polyvinyl alcohol-g-acrylate/maleic anhydride terpolymer comprises 70-30% by weight of polyvinyl alcohol and 30-70% by wieght of acrylate/maleic anhydride copolymer, preferably.

The polyvinyl alcohol-g-acrylate/maleic anhyride terpolymrs can be prepared by first copolymerizing an acrylate monomer with a maleic anhydride monomer to yield a homogenous random acrylate/maleic anhydride copolymer, and then graft polymerizing the rusultant copolymer onto an vinyl alcohol polymer.

The copolymerization of acrylate monomer with maleic anhyride monomer may be carried out by dissolving the monomers in an adequate solvent such as dimethyl sulfoxide and using a free radical initiator which is soluble in the reaction mixture, for example organic peroxides and azobisisobutyronitrile. The reaction temperature is preferably in the range of 40°-80° C. In one of the preferred embodiments, the reaction products were precipitated in a large methanol excess and filtered, in which the maleic anhydride hormopolymer as well as unreacted monomers were seperated by washing with methanol and the acrylate homopolymer were seperated by being dissolved in tolune to obtain the desired copolymer product.

The acrylate/maleic anhydride copolymer are dissolved in suitable solvent such as dimethyl sulfoxide and then vinyl alcohol polymer is added into the solution; the reaction mixture is heated and allowed to react at a temperature ranging from 70°-130° C. for a period of about 24 hours, with mechanical stirring under inert atmosphere such as nitrogen. The reaction products are precipitated in water, and filtered. The products precipitated from water are a mixture of grafted terpolymer, unreacted PVA, and unreacted acrylate/maleic anhydride copolymer. The terpolymer product is seperated and purified by a sequence of solvent extracting technique as illustrated in the following embodiments.

The PVA-g-acrylate/maleic anhydride terpolymers reaction product is confirmed by infrared analysis having the following general structure:

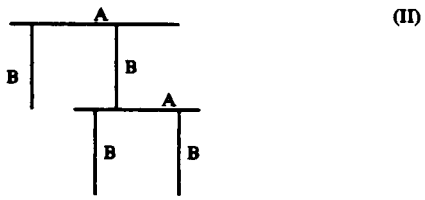
(II)

wherein A represents the polyvinyl alcohol; B represents the acrylate/maleic anhydride copolymer, and the linking between A and B is accomplished by a open-chain esterification reaction between the anhydride groups on the acrylate/maleic anhydride copolymer and the hydroxyl groups on the polyvinyl alcohol.

The PVA-g-acrylate/maleic anhydride terpolymers of present invention may be further subjected to a heating treatment to form interchain ester linkages between the residual anhydride groups on the side chains and the residual hydroxyl groups on the PVA backbone thus yielding better thermoresistance and mechanical properties. It has been concluded that 2-3 hours at about 90°-160° C. is sufficient to develope fully the ester linkage.

The residual anhydride groups on the side chains of the PVA-g-acrylate/maleic anhydride terpolymer enable the terpolymer to react with an amine, such as ethanol amine, n-benzyl amine, n-butyl amine, and n-octyl amine, to form N-substitute maleamic acid intermediate. This intermediate is further dehydrated under vaccum condition to yield a PVA-g-acrylate/N-substitute maleimide terpolymer. As is well known to those skilled in the art, the imide groups on the side chains will enhance the terpolymer in heat stability.

The following examples are grven in illustration of the invention and are not intended as limitations thereof.

EXAMPLE 1:

Material

PVA BF-17, a product of Chang Chun Petrochemical Co., Taiwan, DP=1700, degree of saponification of 98.5-99.2 mol% and viscosity of 25°-30° C. was used. Maleic anhydride (MA), methyl methacrylate (MMA), and dimethyl sulfoxide (DMSO) of reagent grades were purchased from Wako Pure Chemical Industries, Japan. MMA was washed with aqueous sodium hydroxide and distilled water, neutralized with hydrochloric acid. It was then refluxed and distilled over calcium hydride and hydroquinone. Azobisisobutyronitrile (AIBN) of a reagent grade used as the initiator was purchased from Nakarai Chemical Co., Japan. Solvents such as toluene, methanol, and acetone were used without further pruification.

Copolymerization of MMA and MA (Reaction 1)

The copolymerization reaction was carried out a four-necked flask equipped with a stirrer, thermometer, condenser, and nitrogen inlet. The general experimental procedures were as follows: MMA 50 g and MA 48 g were dissolved in 20 ml DMSO after being stirred in an atmosphere of nitrogen. The reaction temperature was adjusted at 70° C., and 1 g AIBN was added as an initiator. The reaction was allowed to proceed for 5 h. The products were precipitated in a large methanol excess.

The products precipitated from methanol in Reaction 1 were a mixture of MMA-co-MA copolymer and unreacted MA, as well as homopolymer of MMA and MA. They were separated and purified as introduced:

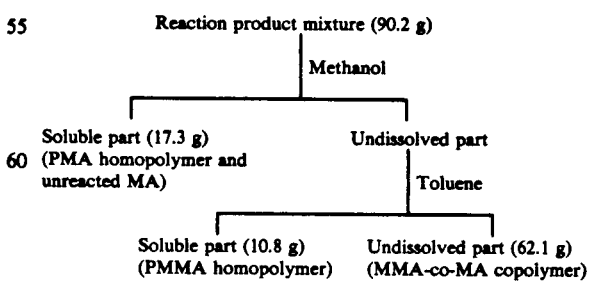

After the separation, all materials must be dried in a vacuum below 30° C. The composition of MMA-co-MA was calculated as follows:

mole % of MA in copolymer =

$$\frac{(A)}{\text{mole of MMA-co-MA}} \times 100\%$$

$(A)$ = mole of MA feed − (mole of MA homopolymer + mole of unreacted MA) mole of MMA in copolymer =

100% − mole % of MA in copolymer

The mole% of MA and MMA in copolymer were calculated as 0.53 mole% and 0.47 mole%, respectively.

Coupling Reaction between MMA-co-MA and PVA (Reaction 2)

MMA-co-MA (10 g) prepared as described above was dissolved in DMSO (120 mL), and after complete dissolution, PVA (10 g) was added. The reaction was allowed to react at 100° C. for 24 h with mechanical stirring under nitrogen. The products were precipitated in water. The products precipitated from water in Reaction 2 were a mixture of grafted terpolymer PMA-g-MMA/MA, unreacted PVA, and unreacted MMA-co-MA. They were separated and purified as shown:

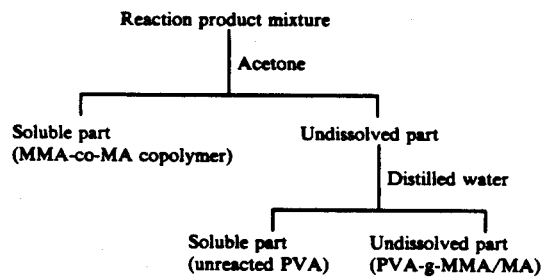

After the separation, all materials must be dried in a vacuum below 30° C. Data of grafting terpolymerization were calculated as follows:

wt % of MA in graft terpolymer $$= \frac{(B) \times (\text{wt \% of MA in MMA-co-MA})}{\text{wt of PVA-g-MMA/MA}} \times 100\%$$

$(B)$ = wt of MMA-co-MA feed − wt of unreacted MMA-co-MA wt % of MMA in graft terpolymer $$= \frac{(B) \times (\text{wt \% of MMA in MMA-co-MA})}{\text{wt of PVA-g-MMA/MA}} \times 100\%$$

wt % of PVA in graft terpolymer $$= \frac{\text{wt of PVA feed} - \text{wt of unreacted PVA}}{\text{wt of PVA-g-MMA/MA}} \times 100\%$$

= 100% − (wt % of MA in PVA-g-MMA/MA + wt % of MMA in a PVA-g-MMA/MA)

The major difficulty encountered in the synthesis of this graft terpolymer was gel formation, due to the presence of many anhydride groups in the MMA-co-MA copolymer and many hydroxyl groups in PVA backbone. It was found that gelation would occur when PVA/MMA-co-MA (wt ratio) >2. Attempts were made to minimize the problem by properly adjusting the total initial concetration of reactants.

For different weight per cents PVA in feed, (MMA-co-MA, mol fraction=0.47:0.53) the composition of PVA-g-MMA/MA is shown in Table 1.

TABLE 1

| | | composition of PVA-g-MMA/MA | | | |
|---|---|---|---|---|---|
| Run | PVA feed (wt %) | PVA (wt %) | MMA (wt %) | MA (wt %) | Yield % |
| 1 | 33.3 | 39.2 | 28.5 | 32.3 | 76.4 |
| 2 | 50.0 | 53.8 | 21.7 | 24.5 | 80.0 |
| 3 | 66.7 | 68.3 | 14.8 | 16.9 | 87.1 |

Preparation of Membrane of Graft Terpolymer

Membranes were prepared from about 30% solution of the graft terpolymer in DMSO. The solution was cast over a clean glass plate which was allowed to dry at 30°–40° C. in a vacuum to constant weight before the membrane was removed from the plate.

Heat treatment of Graft Terpolymer Above-described membranes were heated at 100° C. in vaccum for about three hours. The PVA-g-MMA/MA membranes fromed a crosslinking network as a result of the interchain ester linkage during the heat treatment, as proposed below:

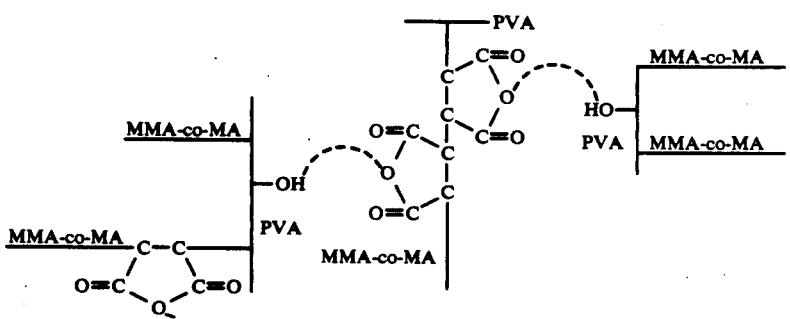

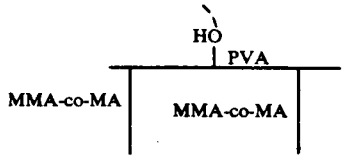

Properties of Graft terpolymer

Viscosity

The intrinsic viscosities of PVA, MMA-co-MA, and PVA-g-MMA/MA were determined in DMSO in an Ubbelohae viscometer at 30° C., by extrapolating of $\eta_{sp}/c$ to $c=0$.

Infrared Spectra

IR spectra were obtained from films or in mixtures with KBr on a JASCO Model A-202 spectrophotometer.

Water Content

Membranes were first immersed in boiling water for 6 h and then removed. The membranes were superficially dried with filter paper and weighted. Water content was calculated using water content (%) =

$$\frac{\text{wt of membrane after absorption water}}{\text{wt of original membrane}} \times 100\%$$

Mechanical

The tensile strength and elongation at break of membranes were determined by the ASTM D-638 test method by Instron Model 1130.

Thermal Analysis

TGA measurement were performed on a DuPont Instruments 1090B analyzer. TGA was measured on 951 thermogravimetric analyzer at a heating rate of 20° C./min in a nitrogen atmosphere at a flow 100 mL/min.

The properties of Graft terpolymers are shown in the following FIGS. 1-6 respectively.

EXAMPLE 2:

The procedures as described in above Example 1 were repeated except that the feeds charged to the reaction vessel of copolymerization of MMA and MA were as shown in Table 2. The composition and yield of MMA/MA copolymers were also shown in Table 2. The properties of the PVA-g-MMA/MA terpolymers are described in the following FIGS. 1-6.

TABLE 2

| Monomer feed[a] (mole fraction) | | Copolymer composition (mole fraction) | | Yield (%) | Intrinsic viscosity (dL/g) |
|---|---|---|---|---|---|
| MMA | MA | MMA | MA | | |
| 0.50[b] | 0.50 | 0.47 | 0.53 | 63.4 | 0.073 |
| 0.60 | 0.40 | 0.54 | 0.46 | 67.2 | 0.080 |
| 0.75 | 0.25 | 0.65 | 0.35 | 68.3 | 0.103 |
| 0.85 | 0.15 | 0.74 | 0.26 | 72.6 | 0.122 |

[a]AIBN (g) = (MMA + MA) (g) × 0.01; DMSO (g) = (MMA + MA) (g) × 0.2.
[b]Example 1

As shown in FIG. 1, there is a marked increase in $[\eta]$, with increasing the MA content in MMA-co-MA. This increase of $[\eta]$ could be explained by an increase of the number of grafted side chain due to higher MA content having higher reactivity with PVA. It should be noted that the $[\eta]$ of PVA-g-MMA/MA is more than twice of original PVA (1.5 dL/g) when the higher MA content copolymer was used, and this result reflects that one graft terpolymer molecular could contain more than one PVA backbone as proposed strcuture II.

Figure 2:
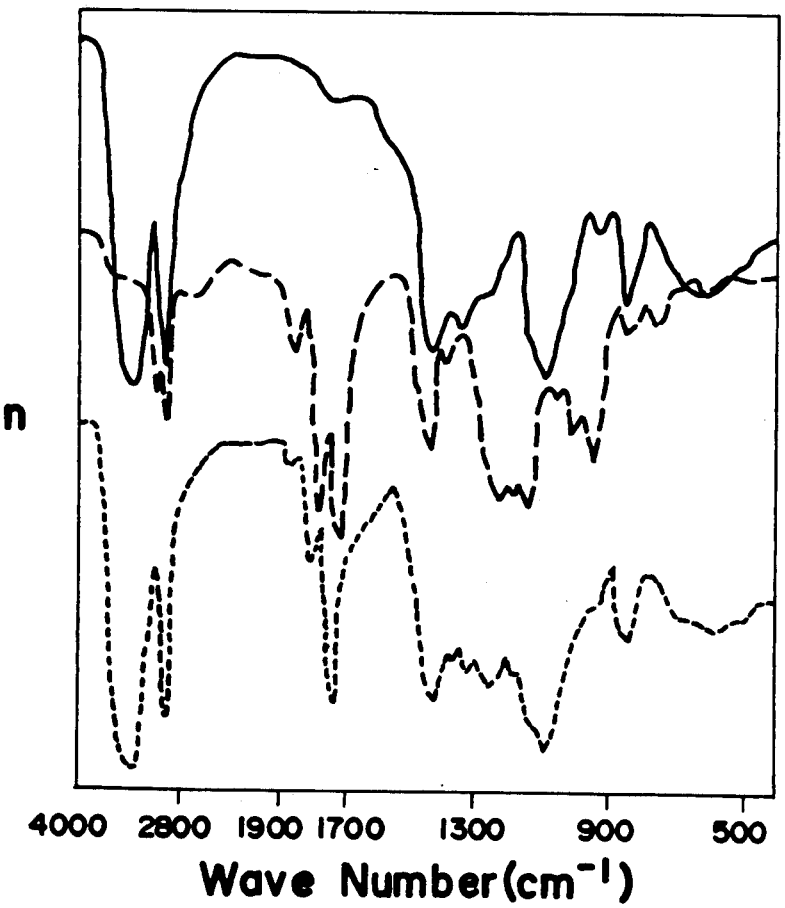
FIG. 2 is a graphic plot showing IR spectra of MMA-co-MA PVA, and PVA-g-MMA/MA.

FIG. 2 shows the IR spectra of MMA-co-MA, PVA, and PV-g-MMA/MA. The IR spectrum of PVA-g-MMA/MA contains the characteristic band of anhydride groups (1860 and 1780 cm$^{-1}$) and carbonyl groups (1735 cm$^{-1}$) from the grafted MMA-co-MA side chain It should point out that the MA content in PVA-g-MMA/MA is not all present as anhydride; some anhydride groups are converted into ester groups by esterification with PVA. The mole ratio (M) of the residual anhydride units in PVA side chain to the original anhydride units in MMA-co-MA is measured by infrared spectroscopy.

For PVA-g-MMA/MA graft terpolymer:

$$A_1 = a_{11}x_1 + a_{12}x_2 + a_{13}x_3 + a_{14}x_4 \quad (1)$$

$$A_2 = a_{21}x_1 + a_{22}x_2 + a_{23}x_3 + a_{24}x_4 \quad (2)$$

where $A_1$ = the integral absorbance of the anhydride carbonyl extended from 1923 to 1770 cm$^{-1}$, $A_2$ = the integral absorbance of the ester and /or acid carbonyl extended from 1770 to 1667 cm$^{-1}$, $x_1$, $x_2$, $X_3$, and $X_4$ = mol/L of succinic anhydride, succinate, methyl methacrylate, and vinyl acetate groups, respectively, and $a_{ij}$ = the absorptivity of groups type j at band i.

The absorbance of PVA in this region could be ignored because the almost hydrolyzed PVA shows about no carbonyl absorption; thus $$a_{14} = I_{24} = 0 \quad (3)$$

The integral absorbance of MMA in region A is equal to zero:

$$a_{13} = 0 \quad (4)$$

The mole ratio (F) of MA to MMA in MM-co-MA copolymer could be obtained from Table 2:

$$(x_1 + x_2)/x_3 = F \quad (5)$$

The value of M could be solved by combining eqs. (1)–(5)

$$M = x_1/(x_1 + x_2) = (C)/(C) + (D)$$

$$(C) = a_{23}A_1 + a_{22}A_1F - a_{12}A_2F$$

$$(D) = a_{11}A_2F - a_{21}A_1F$$

The results are shown in Table 3. The value of M decreases with increasing PVA feed wt%.

TABLE 3

The Value of M after the Coupling Reaction of PVA with MMA-co-MA

| Copolymer composition (mole fraction) | | PVA feed (wt %) | $X_1/(X_1 + X_2)$ |
|---|---|---|---|
| MMA | MA | | |
| 0.47 | 0.53 | 33.3 | 0.58 |
| | | 50.0 | 0.44 |
| | | 66.7 | 0.35 |
| 0.54 | 0.46 | 33.3 | 0.54 |
| | | 50.0 | 0.42 |
| | | 66.7 | 0.31 |
| 0.65 | 0.35 | 33.3 | 0.57 |
| | | 50.0 | 0.45 |
| | | 66.7 | 0.30 |

Figure 3:
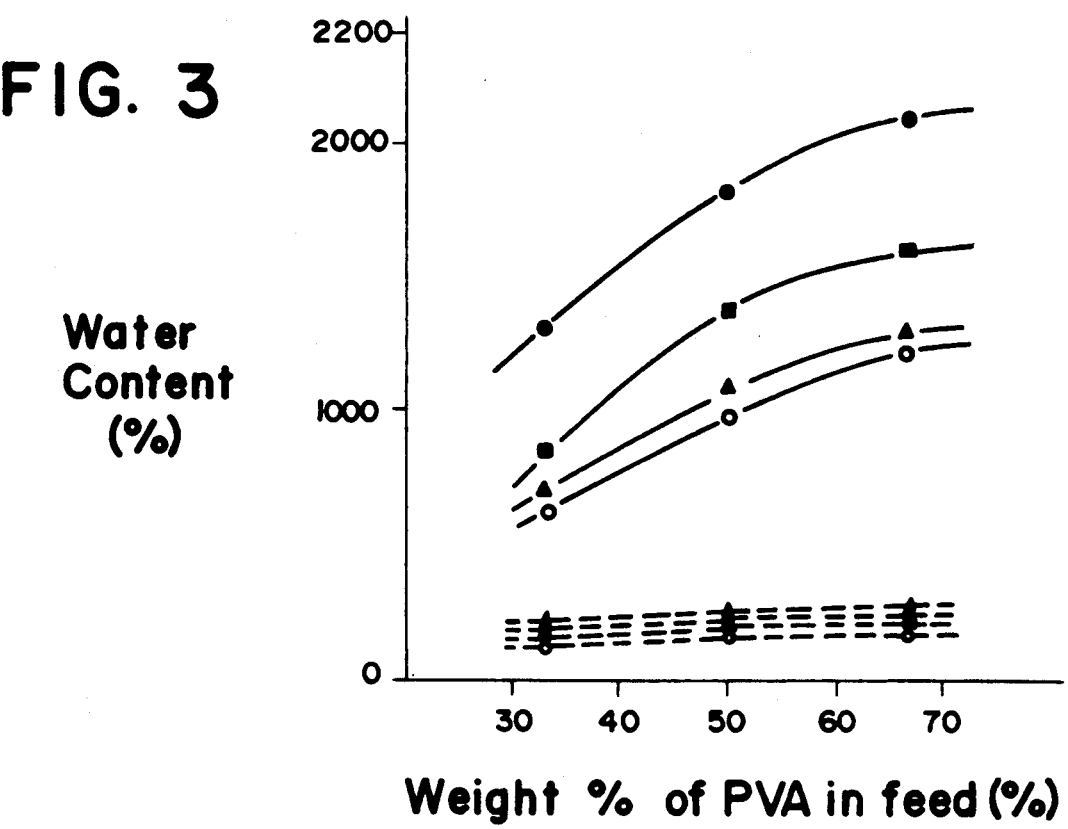
FIG. 3 is a graphic plot showing relationship between water content and wt% of PVA in feed of PVA-g-MMA/MA membranes in dry state and in wet state, and for both being subjected to a heat treatment and for both not being subjected to a heat treatment.
Figure 4:
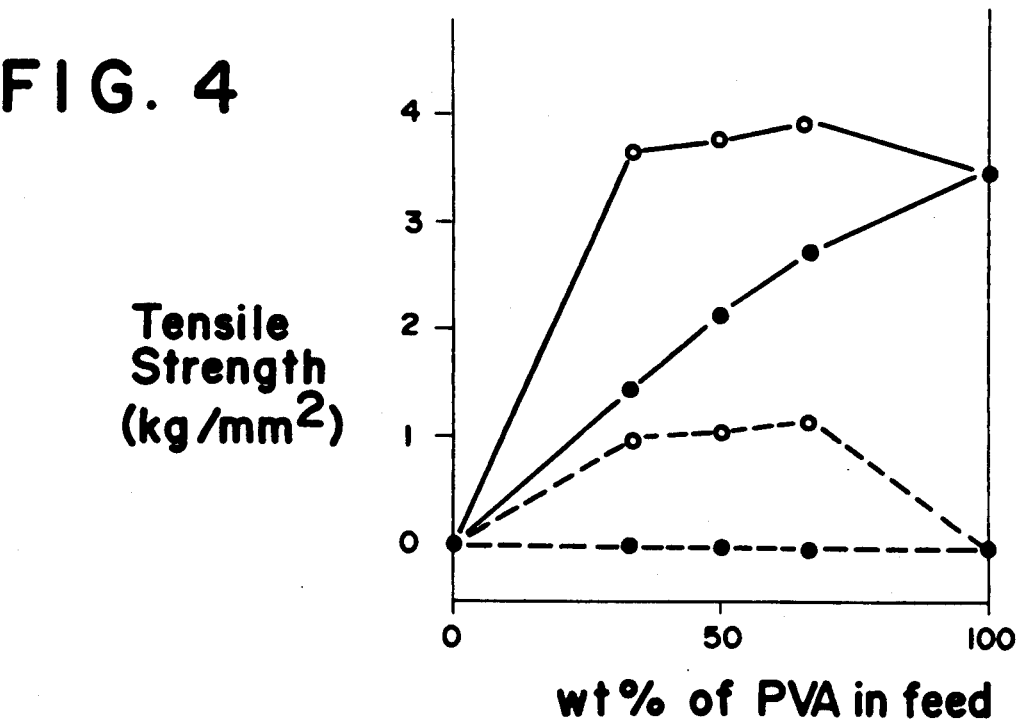
FIG. 4 is a graphic plot showing relationship between tensile strength and wt% of PVA in feed of PVA-g-MMA/MA membranes in dry state and in wet state, for both being subjected to a heat treatment and for both not being subjected to a heat treatment.
Figure 5:
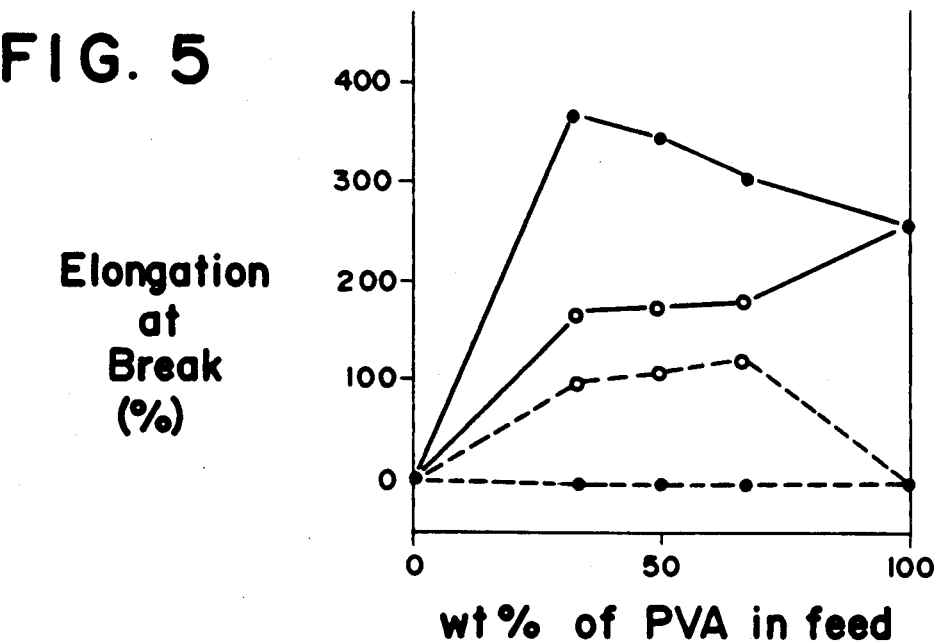
FIG. 5 is a graphic showing relationship between elongation at break and wt% of PVA in feed of PVA-g-MMA/MA membranes in dry state and in wet state, for both being subjected to a heat treatment ment and for both not being subjected to a heat treatment.

It can be clearly seen from FIG. 3–5 that the grafted terpolymers shown a higher water resistance and better mechanical properties than the PVA after heat treatment, due to the occurrence of interchain ester linkage.

Figure 6:
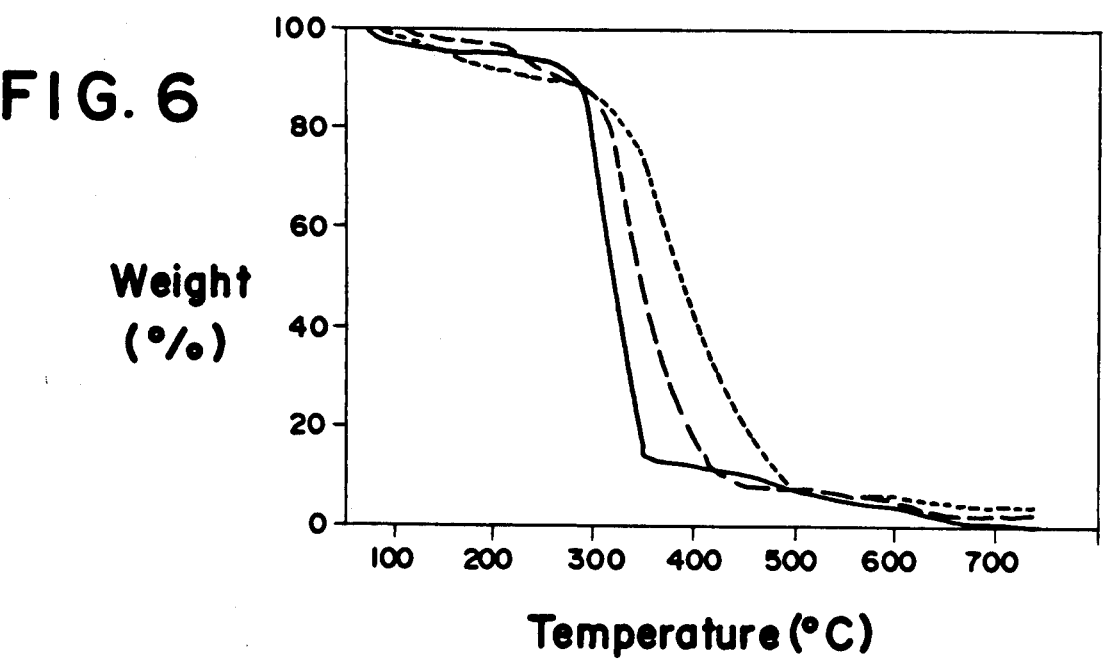
FIG. 6 is a TGA thermogram of PVA, MMA-co-MA, and PVA-g-MMA/MA.

Thermograms from TGA are shown in FIG. 6, we can seen that the grafter terpolymer has better thermal resistance and higher residual weights than PVA and MMA-co-MA.

EXAMPLE 3

SYNTHESIS OF PVA-g-MMA/NEMI 5 g of the PVA-g-MMA/MA produced and purified in Run (:) of above Example 1 was dissolved in 50 mL DMSO, and 10 g N-benzyl amine was added. The reaction proceeds at a temperature of 100° C. for 12 hours. After reaction, the reaction mixture was precipitated in a large methanol excess, and the precipitate was filtered and washed with methanol, dried in a vaccum oven to obtain PVA-g-MMA/N-benzyl maleamic acid product.

The PVA-g-MMA/N-benzyl maleamic acid was dissolved in DMSO and cast into membrane at 30° C. in vacuum, and further converted to PVA-g-MMA/N-benzyl maleimide membrane by gradually heating to 220° C. in vaccum for 10 minutes.

We claim:

1. An acrylate/N-substituted maleimide co-polymer having polyvinyl alcohol units grafted thereto;

said acrylate/N-substituted maleimide co-polymer made by reacting an amine with a homogeneous random acrylate/maleic anhydride co-polymer having polyvinyl alcohol units grafted to a portion of the maleic anhydride units to form an N-substituted maleamic acid intermediate and then converting the intermediate to form the acrylate/N-substituted maleimide co-polymer having polyvinyl alcohol units grafted thereto;

said acrylate/maleic anhydride co-polymer having polyvinyl alcohol units grafter thereto, comprising 70–30% by weight of polyvinyl alcohol and 30–70% by weight of substantially homogeneous random acrylate/maleic acid co-polymer;

said acrylate/maleic anhydride co-polymer having the following general structure:

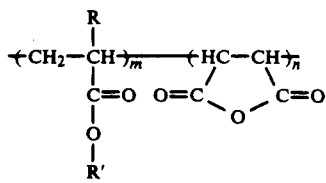

where R is hydrogen or methyl;
R' is $C_1$–$C_4$ saturated alkyl group;
m is 30–90 mole percent; and
n is 70–10 mole percent;
said acrylate/maleic anhydride co-polymer having polyvinyl alcohol units grafter thereto, formed by grafting the acrylate/maleic acid co-polymer onto polyvinyl alcohol by a chain-opening esterification reaction between some of the anhydride groups of the maleic anhydride units and some of the hydroxyl groups of the polyvinyl alcohol;
whereby residual hydroxyl and maleic anhydride groups are present in an effective amount for subsequent cross-linking through the action of heat to form interchain ester chain linkages and residual maleic anhydride groups are present in an effective amount for subsequent reaction with the amine to form the acrylate/N-substituted maleimide co-polymer having polyvinyl alcohol units grafted thereto.

2. The polymer of claim 1 wherein R' is methyl.
3. The polymer of claim 1 wherein R' is methyl.
4. The polymer of claim 2 wherein R' is methyl.
5. The polymer of claim 1 wherein m is 50–9 mole percent and n is 10–50 mole percent.
6. The polymer of claim 1 which has been cross-linked by subjected it to a heat treatment at a temperature ranging from 90°–160° C. for a period of 1–3 hours.
7. The polymer of claim 6 wherein R is methyl.
8. The polymer of claim 6 wherein R' is methyl.
9. The polymer of claim 7 wherein R' is methyl.
10. The polymer of claim 6 wherein m is 50–90 mole percent and n is 10–50 mole percent.
11. The polymer of claim 1 wherein the intermediate is converted by dehydration under vacuum conditions to form the acrylate/N-substituted maleimide co-polymer having polyvinyl alcohols units grafted thereto.
12. The polymer of claim 11 wherein the amine is selected from the group consisting of ethanol amine, n-benzyl amine, n-butyl amine and n-octyl amine.

* * * * *